United States Patent [19]

Segersten

[11] 4,398,929
[45] Aug. 16, 1983

[54] COMPRESSED AIR DEHUMIDIFIER

[75] Inventor: CARL R. Segersten, Malmösex, Sweden

[73] Assignee: SAB Automotive AB, Landskrona, Sweden

[21] Appl. No.: 326,754

[22] Filed: Dec. 2, 1981

[30] Foreign Application Priority Data

Dec. 9, 1980 [SE] Sweden .................. 8008632

[51] Int. Cl.³ ............................................. B01D 53/04
[52] U.S. Cl. ......................................... 55/163; 55/196; 55/310; 55/DIG. 17; 137/113
[58] Field of Search ............... 55/31, 33, 62, 161–163, 55/179, 180, 196, 245, 387, DIG. 17, 310; 137/113, 119; 210/DIG. 6

[56] References Cited

U.S. PATENT DOCUMENTS

| | | | |
|---|---|---|---|
| 1,887,589 | 11/1932 | Farmer | 55/163 |
| 3,323,292 | 6/1967 | Brown | 55/163 |
| 3,324,631 | 6/1967 | Kreuter | 55/163 |
| 3,365,861 | 1/1968 | Crowley et al. | 55/162 |
| 3,659,399 | 5/1972 | Kauer, Jr. et al. | 55/163 |
| 4,295,863 | 10/1981 | Lattuada | 55/33 |
| 4,331,457 | 5/1982 | Mörner | 55/163 |

FOREIGN PATENT DOCUMENTS 453470 12/1948 Canada ........................... 55/179

Primary Examiner—David L. Lacey
Attorney, Agent, or Firm—Laurence R. Brown

[57] ABSTRACT

A compressed air dehumidifier comprises two containers having an adsorbent therein and having connections for the supply and delivery of air. Valve structure are provided for connecting the containers alternatingly one at the time into a compressed air system for passing air to be dehumidified through the connected container. Apparatus is provided for choked bleeding of a fraction of the dehumidified air from the connected container to the other container. A control valve (16–19) for accomplishing said alternatingly connection and for discharging said air fraction from said other container to the surrounding air includes a valve body (19), which has two recesses (37) for locking engagement one at the time with an axially movable valve stem (26) in order to hold the valve body against either one of two seats (16, 17), between which the valve body is movable.

4 Claims, 2 Drawing Figures

4,398,929

COMPRESSED AIR DEHUMIDIFIER

TECHNICAL FIELD

This invention relates to a compressed air dehumidifier, comprising two containers having an adsorber therein and having connections for the supply and delivery of air, valve means for connecting the containers alternatingly one at the time into a compressed air system for passing compressed air to be dehumidified through the connected container, means for choked bleeding of a fraction of the dehumidified air from the connected container to the other container, and a control valve for accomplishing said alternatingly connection and for discharging said air fraction from said other container to the surrounding air, said control valve including a valve body movable between two seats and a valve stem axially movable either to mechanically lock the valve body against one seat or to release it therefrom for movement to the other seat.

BACKGROUND ART

Generally speaking, several designs for compressed air dehumidifiers are known, and a growing demand for such dehumidifiers has been noted, especially in the vehicle field, where humid air causes severe problems.

In one type of dehumidifier a pneumatic signal from the air compressor system is used for governing the use of either one of the two containers for dehumidifying and regenerating, respectively. A typical example of this type is shown and described in the published International Patent Application WO No. 79/00642 (U.S. Pat. No. 4,331,457 granted May 25, 1982), to which reference is being made for further understanding of the present invention and in which FIG. 3 shows a control valve of the type with which the present invention is concerned.

The prior control valve design as shown therein has several drawbacks, of which an important one is the relatively long axial movement of the valve stem required to release and again lock the valve body in the form of a ball, as the valve stem must reach past the center line of the ball to safely lock it against the respective seat. This relatively long control movement not only adds to the dimension of the control mechanism extending out of the dehumidifier in an exposed position but also is a drawback for the desired function of the valve under different conditions.

THE INVENTION

A far better design is according to the invention attained in that the valve body has two recesses for locking engagement one at the time with the valve stem in order to hold the valve body against either one of the seats.

It is obvious that the valve stem need only move the short distance into and out of the respective recesses.

In a preferred embodiment further advantages are obtained in that the valve body is substantially cylindrical with spherical or conical ends for cooperation with the seats, that the valve body between the recesses is provided with a shallower groove, and that each recess has a shape corresponding to that of the tapered or pointed end of the valve stem.

In this way the valve body will only move a short axial distance between the two seats under complete control from the valve stem. The risks for malfunctions are minimized.

In the prior art valve mentioned above the discharge of the air fraction from the container to be regenerated occurs through the valve stem, which is hollow and is conditionally sealed against a rather complex sealing arrangement at the lower part of the control mechanism, adding both to the dimensions and costs for the control mechanism and increasing the risk for malfunction.

A better solution to the problem of discharging said air fraction is according to a further feature of the invention attained in that the valve stem is provided with an annular flange, which at its outer periphery sealingly cooperates with the inner periphery of a sealing ring. When the valve stem is retracted from the recesses in the valve body a discharge passageway is left open through the sealing ring.

The control valve stated as the prior art above is only usable for the case when compressed air acting as the pneumatic signal is supplied to the control cylinder in order to withdraw the valve stem against spring bias from the valve body, when this shall be shifted over from one seat to the other. In an air compressor system with a governor valve between the compressor switch and an air tank charged by the compressor via the dehumidifier, in order to deenergize the drive motor of the compressor at a predetermined air pressure in the air tank, also the supply of compressed air to the control cylinder can be controlled by the governor valve in order to operate the control valve, when the compressor is shut off.

However, in an air compressor system governed by an unloader valve, which is connected in series with the dehumidifier upstream thereof between the compressor and the air tank, the compressor runs continuously, and at a predetermined pressure in the air tank the connection between the compressor and the air tank is shut off and the compressor is connected to the atmosphere by the unloader valve. Thus no air signal is available for the control valve, when the compressor is unloaded, and accordingly the prior art control valve cannot be used. It is of course desirable to have the possibility to use the dehumidifier in either system without substantial modifications.

This is according to the invention attained in that a control compartment with an inlet is provided on either side of a diaphragm connected to the valve stem and that a spring acting on said diaphragm may be arranged in either one of said two compartments.

In a governor valve compressor system the air signal is supplied to the upper control compartment, whereas the lower compartment is vented to the atmosphere and is provided with the spring. In an unloader valve system the air signal is instead supplied to the lower control compartment, whereas the spring is arranged in the upper compartment.

BRIEF DESCRIPTION OF THE DRAWINGS

The invention will be described in further detail below reference being made to the accompanying drawings, in which.

DESCRIPTION OF A PREFERRED EMBODIMENT

Figure 1:
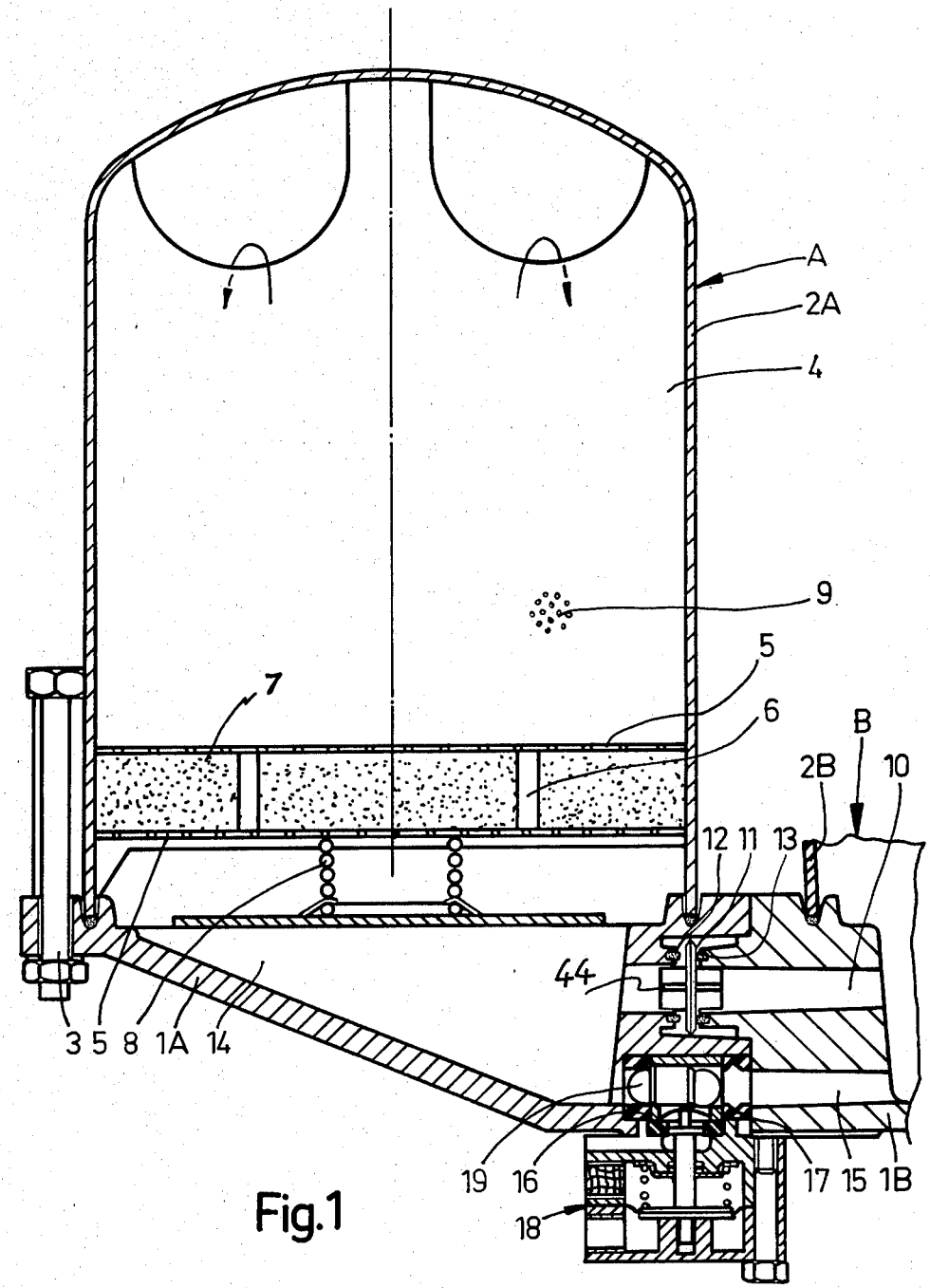
FIG. 1 is a section through a dehumidifier with a control valve according to the invention and FIG. 2 is a section of substantially only this control valve to a larger scale.

A dehumidifier shown in FIG. 1 comprises two basically identical units A and B connected to each other at a dividing plane. Each unit has a supporting base 1A and 1B, respectively, on top of which a container 2A and 2B, respectively, is mounted by means of screw connections 3. Each container is cylindrical and has a dome-shaped upper end, whereas its lower end is open and sealed against the associated base. In each container there is a central, axial partition wall 4 dividing the interior of the container into two identical compartments. The partition wall 4 has cut-outs at its upper end for inter-connecting the two compartments. The lower end of each component is closed off by a bottom wall comprising two perforated plates 5, spacer pins 6, and a filter material 7, such as foamed polyester, between the plates 5. The bottom wall 5-7 is slidable in the container and is biased by a spring 8. Each container is filled with a granulated adsorbent indicated at 9. This adsorber may be of the type used in prior art dehumidifiers and is held under pressure by the spring-biased bottom wall 5-7 so as to be maintained in a packed condition in the container.

The base 1A of unit A has an inlet (not shown) for receiving compressed air to be dried and in communication with a transverse bore 10 partly in the base 1A and partly in the base 1B. An inlet check valve 11 is guided for reciprocal movement in the bore to seal alternatingly at one and the other of two annular gaskets 12 and 13 surrounding the bore 10. The bore 10 communicates with each container 2A and 2B at the lower end of one compartment therein through a passage 14 as shown with respect to container 2A in FIG. 1.

In the same manner but not illustrated the base 1B of unit B has an outlet for the delivery of compressed dry air. This outlet communicates with a further transverse bore partly in the base 1A and partly in the base 1B. An outlet check valve co-operating with two annular gaskets is provided in the bore, and the arrangement is identical with that described with respect to the inlet check valve 11. This bore communicates with each container 2A and 2B at the lower end of the other compartment therein, i.e. the compartment on the side of the partition wall 4 which is opposite to the compartment communicating with the bore 10.

Figure 2:
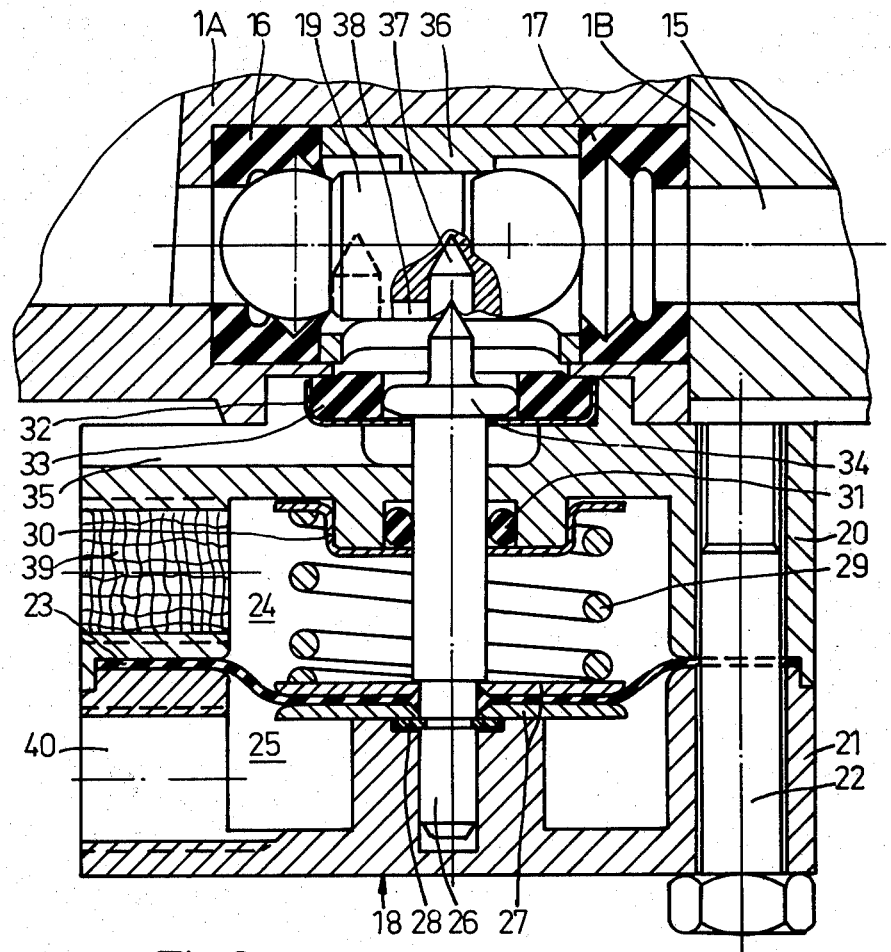

A third transverse bore 15 is formed partly in the base 1A and partly in the base 1B and communicates with the same compartment in each of the containers as the bore 10 also at the lower end of the compartment. Two axially spaced elastic seats 16 and 17 are mounted in the bore 15, and a control mechanism 18, described in further detail below with reference to FIG. 2, is attached to the bases 1A and 1B for controlling a shuttle valve body 19 co-operating alternatingly with the seats.

Dependent on the valve body 19 being engaged with one or the other of the seats 16 and 17 a connection is established between container 2A and 2B and the surrounding atmosphere through the transverse bore 15 and the control mechanism 18, as will be apparent below.

The valve body 19 is positively held against the related seat 16 or 17 in a way to be described, but may be released for movement from one seat to the other.

In a further transverse bore (not shown), extending in parallel with the transverse bore 15 and accordingly connecting the same compartments in the containers 2A and 2B at the lower end thereof as the bore (not shown) parallel with the bore 10, there is provided an insert with a restricted opening allowing only a choked flow of compressed air between said compartments or in other words a bleeding of a fraction of the air.

As a simplifying alternative the restricted opening may instead be provided in the outlet check valve itself, as shown by passage 44 in FIG. 1, thus eliminating a bore and an insert therein.

The operation of the dehumidifier as described above is as follows:

It is assumed that a conduit for compressed air from the compressor is connected to the inlet on the base 1A for delivering compressed air through the transverse bore 10 to the left container 2A when the check valve 11 is in the position shown in FIG. 1. If this valve is not in this position, the air will flow through the transverse bore 10 to the right and will escape to the atmosphere through the transverse bore 15 and the control mechanism 18. As a consequence thereof the check valve will be drawn by the air flow to the position shown, so that the direct connection to the atmosphere will be closed.

The pressurized air will pass from the bottom of the container 2A through the filter material 7 in one compartment of said container for separating out free water and oil entrained in the compressed air. The air passes upward and downwards through the granulated adsorber 9 in the two compartments of the container. The compressed air is hereby dehumidified and leaves the container 2A at the bottom of said other compartment through the outlet via the transverse bore parallel with the bore 10, the check valve being held in position therefor by the air pressure. The dry air thus delivered from the dehumidifier is supplied to the compressed air system.

However, a minor portion of the dry compressed air, e.g. about 10 percent, passes through the transverse passage 44 parallel with the bore 15) via the restricted opening to the lower end of one compartment of the other container 2B. The air passes upwards and downwards through this container and leaves it to the atmosphere through the bore 15 and the control mechanism 18, the valve body 19 being positively held against the seat 16. If it is assumed that the granulated adsorber 9 in the container 2B previously has adsorbed water from the compressed air passed therethrough, this adsorber will be regenerated to a dried condition because the dry air passing through the adsorber will take up water therefrom.

Under a certain condition an air signal is supplied to the control mechanism 18. In a way to be described the valve body 19 will be released as a consequence thereof, and due to the pressure difference between the two containers 2A and 2B it will be displaced from the seat 16 to the seat 17. The pressure between the containers is equalized through the transverse bore with the restricted opening and a pressure in the containers will be reached, which is about half the maximum pressure.

When the air signal disappears, the valve body 19 will be positively held in the right hand position in engagement with the seat 17. The container 2A will be vented to the atmosphere through the control mechanism 18, the filter material 7 being cleaned by the air passage therethrough. The inlet check valve 11 will be displaced to the left hand position in engagement with the gasket 12, and the same procedure as described above will be repeated, the air being dehumidified in the container 2B and the adsorber in the container 2A being regenerated.

As will be realized, the dehumidifier will operate alternatingly in the manner described, a minimum amount of the dry air being utilized for the regeneration.

Turning now specifically to FIG. 2 for a more detailed description of the control valve according to the invention, the following details may be recognized from the description above with reference to FIG. 1: the supporting bases 1A and 1B, the transverse bore 15, the seats 16 and 17, the control mechanism 18, and the valve body 19.

The control mechanism 18 has an upper housing part 20 and a lower housing part 21 held together with each other and with the bases 1A and 1B by means of screws 22 distributed around the housing. A rubber diaphragm 23, dividing the interior of the housing into an upper and a lower control compartment 24 and 25 respectively, is clamped between the two housing parts 20 and 21 and is connected to a valve stem 26 by means of two plates 27 and a locking ring 28.

In the shown case the lower plate 27 is held in a rest position against an abutment of the lower housing part 21 by means of a helical compression spring 29 arranged between the upper plate and a cup 30.

This cup 30, which has a press fit on an abutment therefor in the upper housing part 20, not only acts as a spring support (which in fact it does not if the spring 29 as an alternative described below is arranged in the lower compartment 25) but also as a retainer for a sealing O-ring 31 for the valve stem 26.

In the upper portion of the upper housing part 20 facing the base 1A there is arranged a holder 32 with a sealing ring 33 sealingly cooperating as shown with an annular flange 34 on the valve stem 26. The ring 33 also provides a seal relative to the base 1A. Leading from below the sealing ring 33 to the atmosphere there is a venting channel 35 in the upper housing part 20.

Between the two seats 16 and 17 in the base 1A there is a sleeve 36, which holds the seats in their proper positions but also acts as a guiding for the valve body 19, which as shown may comprise two spherical end parts for cooperation with the respective seats 16 and 17 and a cylindrical intermediary part. Conical end parts is an alternative. The sleeve 36 is provided with an opening facing downwards as shown with the purpose both to let the end of the valve stem 26 pass through and allow air to flow from the bore 15 to the channel 35 under certain conditions as will appear below.

The upper end of the valve stem 26 is preferably tapered or pointed and is arranged to cooperate with either one of two correspondingly shaped recesses 37 in the valve body 19 connected by a shallower groove 38. The purpose of the latter one is to allow the valve stem end always to extend into the valve body 19 and thus to prevent it from rotating.

Each of the seats 16 and 17 has as shown three portions with different functions at their respective cooperation with the valve body 19. Assuming that the valve body 19 switches over rapidly against the right hand seat 17, as will be described below, the axially relatively thick portion furthest to the right of the seat 17 will act as a shock-absorber for the swiftly moving valve body 19. The first lip as counted from the right has basically a sealing function, whereas the second lip (thus the one furthest to the left) also has a valve body retaining function, as is visible at the seat 16 in FIG. 2. If no or only a limited differential pressure acts on the valve body 19, it will thus be retained at its seat by the second lip.

In its shown rest position the valve stem flange 34 has a sealing function. When it has left its sealing contact on moving upwards a free passageway is created from the bore 15, past the sealing ring 33 and through the venting channel 35. Oil, dirt and other contaminants from the associated container passes the sealing ring 33 and will partly be deposited thereon. When the valve stem 26 again moves downwards to the shown position, its flange 34 will clean the sealing ring 33 by a scraping action.

Each of the control compartments 24 and 25 is provided with an inlet 39 and 40 respectively. In the shown case the upper compartment 24 is only to be vented to the surrounding air and may thus be provided with a filter plug as indicated, whereas the lower inlet 40 is to be connected to an unloader valve in the compressor system or similar means with the property to submit an air pressure to the lower control compartment 25 except at intervals, when the control valve will perform its intended function to accomplish the switch-over from the active, dehumidifying container to the other one.

Under normal service conditions an air pressure prevails in the lower control compartment 25, holding the valve stem 26 in the raised position in engagement with the corresponding recess 37 in the valve body 19, which thus is kept mechanically locked against the respective seat (16 or 17).

When a pneumatic signal in the form of a lowered air pressure in the compartment 25 is received, the spring 29 lowers the valve stem 26 for releasing the valve body 19, which under the force from the higher pressure prevailing in the active, dehumidifying container swiftly moves over to the second seat (17 or 16).

At the rise again of the air pressure in the lower compartment 25 the valve body 19 will be locked in its new position, and the second container will become active as stated above in the description of the general function of the dehumidifier.

If on the other hand the compressor system is of the type with a governor valve or the like submitting a pneumatic signal in the form of an air pressure only when the container switch-over is to be performed, the spring 29 is located in the lower control compartment 25 for normally biasing the valve stem 26 upwards; the filter plug is located in the lower inlet 40, whereas the upper inlet 39 is connected to the governor valve. It thus follows that the function of the device as a whole will be the same as described above.

I claim:
1. In a dehumidifier system including a compressed air dehumidifier including two containers each with an adsorbent therein and valve means for connecting the containers alternatingly one at a time into a compressed air delivery system for dehumidifying air to be delivered from an air compressor, the improvements comprising, choked bleeding means for passing a fraction of the dehumidified air from the container connected into the delivery system into the other container thereby to create a pressure difference between said two containers, and a valve control mechanism comprising,
  (a) shuttle valve means having a housing and a movable shuttle valve body having two spaced recesses therein and which is axially positionable over a short movable stroke alternately between two mating seats defined in the housing so that when the containers are alternately connected into said air delivery system there is established a discharge path through one of the seats for said fraction of the dehumidified air passing through that said other container to the surrounding atmosphere, said shuttle valve body being axially movable in response to said differential of air pressure between said containers, (b) a locking valve stem axially movable transversely to the shuttle valve body for respectively engaging one of said recesses for mechanically locking the valve body against a respective one of said seats and releasing it for movement to the other seat, (c) means for reciprocating the valve stem axially to lock the shuttle valve into position against either one of said seats and to release the shuttle valve for axial movement of the shuttle valve into an alternate seat in response to the difference of air pressure between said two containers.

2. The system according to claim 1 wherein the shuttle valve body is substantially cylindrical with shaped ends for mating into said seats, said seats comprise a resilient material with a lip positioned for retaining the shaped ends in position on the seat, and the two recesses in the shuttle valve body are connected by a shallow groove which engages the valve stem and thereby retains the valve stem against rotation when it is released from locking position in one of the recesses.

3. The system according to claim 1 wherein the shuttle valve housing has an aperture through which said valve stem extends to engage said recesses, a sealing ring positioned in said aperture, and an annular flange about said stem positioned for mating at its other periphery in sealing contact with said sealing ring when the valve stem is released from the recesses and providing an open discharge venting passageway through the sealing ring to the surrounding atmosphere when the valve stem is locked into one of said recesses, whereby the shuttle valve body is moved axially in response to the differential pressure between said two containers in response to the mating of the valve stem flange in sealing contact with said sealing ring.

4. The system according to claim 3 wherein a stem housing surrounds the axially movable valve stem, the stem housing is divided into two control compartments by a flexible diaphragm connected with the valve stem, and said means for reciprocating the valve stem axially comprises a spring biasing the stem toward one axial position, means providing an air pressure differential upon said diaphragm for normally holding the stem in locking engagement into a recess on the shuttle valve body, and means providing a pneumatic signal in one of the two control compartments to change the air pressure differential on the diaphragm thereby to move the stem out of locking position in a recess and release the shuttle valve body for movement over to the opposite seat in response to the pressure difference between the containers.

* * * * *